(12) United States Patent
Shim et al.

(10) Patent No.: US 7,872,498 B2
(45) Date of Patent: Jan. 18, 2011

(54) CURRENT MODE CIRCUITRY TO MODULATE A COMMON MODE VOLTAGE

(75) Inventors: Daeyun Shim, Cupertino, CA (US); Min-Kyu Kim, Sunnyvale, CA (US); Gyudong Kim, Sunnyvale, CA (US); Keewook Jung, San Jose, CA (US); Seung Ho Hwang, Los Altos, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 0 days.

(21) Appl. No.: 12/555,300

(22) Filed: Sep. 8, 2009

(65) Prior Publication Data

US 2009/0323830 A1    Dec. 31, 2009

Related U.S. Application Data

(63) Continuation of application No. 11/643,388, filed on Dec. 20, 2006, now Pat. No. 7,589,559.

(51) Int. Cl.
  *H03K 19/0175* (2006.01)
(52) U.S. Cl. .......................................... 326/68; 326/86
(58) Field of Classification Search .................. 326/68, 326/82–83, 86–87; 327/108, 109
  See application file for complete search history.

(56) References Cited

U.S. PATENT DOCUMENTS

| | | | |
|---|---|---|---|
| 6,307,543 B1 | 10/2001 | Martin | |
| 6,469,652 B1 | 10/2002 | Aude | |
| 6,617,888 B2* | 9/2003 | Volk | 327/67 |
| 6,639,434 B1* | 10/2003 | Rahman | 327/108 |
| 6,696,890 B2 | 2/2004 | Hedberg et al. | |
| 6,731,135 B2* | 5/2004 | Brunolli | 326/83 |
| 7,348,810 B1 | 3/2008 | Nair | |
| 2006/0187329 A1 | 8/2006 | Panicacci | |
| 2006/0232336 A1 | 10/2006 | Gatti | |

* cited by examiner

*Primary Examiner*—James Cho
(74) *Attorney, Agent, or Firm*—Blakley, Sokoloff, Taylor & Zafman LLP

(57) ABSTRACT

In some embodiments, a chip includes transmitters to transmit differential signals on conductors; and current mode circuitry to selectively modulate a common mode voltage of the differential signals to communicate data. In other embodiments, a system includes a first chip to transmit first and second differential signals on conductors, and a second chip. The second chip includes receivers to receive the first and second differential signals from the conductors and provide received signals representative thereof, and current mode circuitry to selectively modulate a common mode voltage of either the first or second differential signals to communicate data and wherein the first chip includes common mode detection circuitry to detect changes in the common mode voltage. Other embodiments are described and claimed.

23 Claims, 8 Drawing Sheets

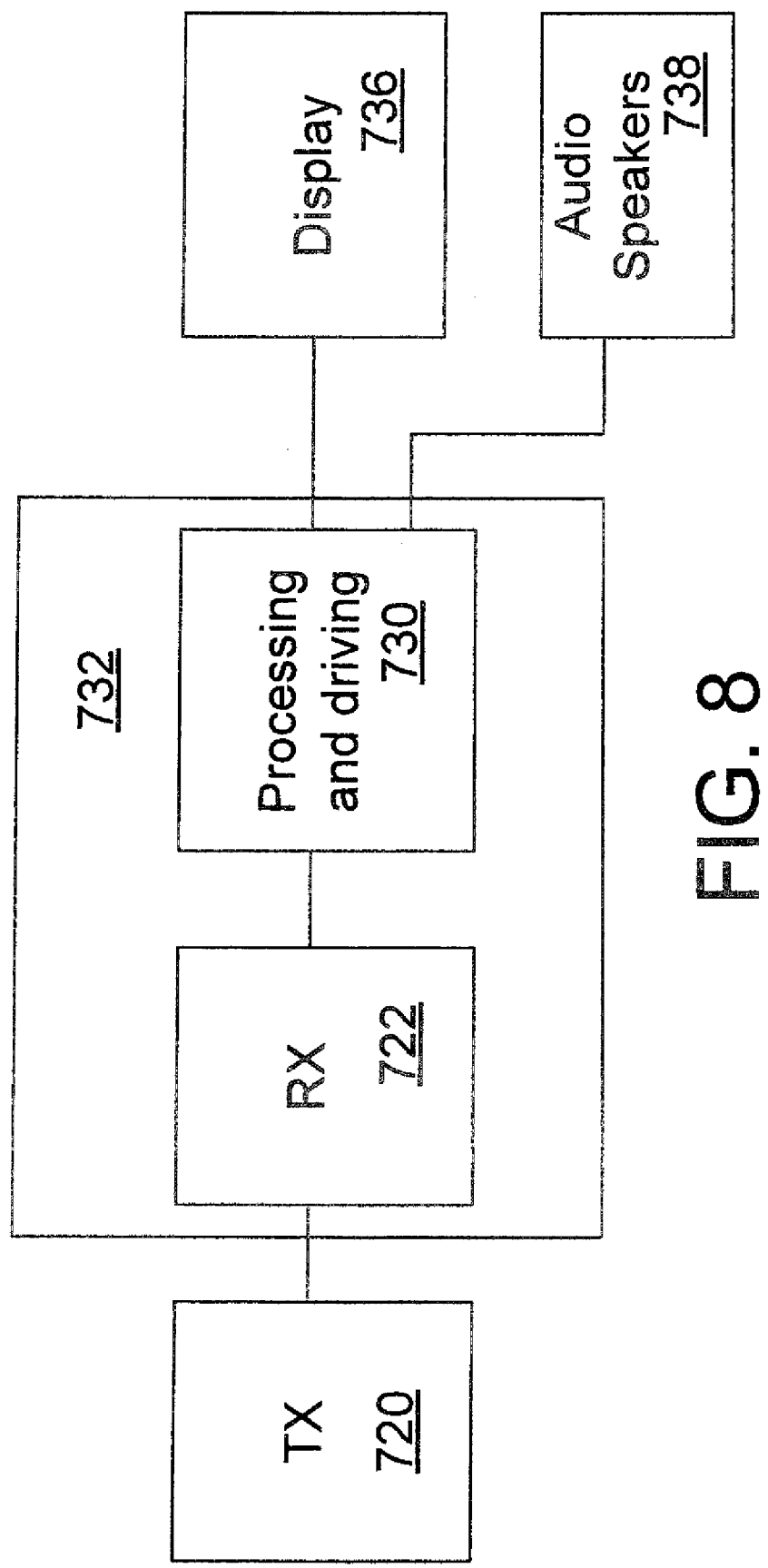

CURRENT MODE CIRCUITRY TO MODULATE A COMMON MODE VOLTAGE

RELATED APPLICATION

This application is a Continuation Application of U.S. application Ser. No. 11/643,388, now issued as U.S. Pat. No. 7,589,559, entitled CURRENT MODE CIRCUITRY TO MODULATE A COMMON MODE VOLTAGE, filed on Dec. 20, 2006, and priority is claimed thereof.

FIELD

Embodiments of the inventions relate generally to transmitted and receiving signals.

BACKGROUND

PanelLink® is a digital video interface (DVI) specification to provide video data over a cable through differential signaling. Although the specification specifies both the differential voltage swing and common mode range, there is a some room for common-mode variation. If the common mode varies with this room, the receiver is supposed to detect the original data correctly. By intentionally varying the common mode value, additional data can be transferred over the same cable without hurting the original video data. This data transfer can occur in both directions as long as the common mode data and differential mode data do not interfere with each other.

FIG. 1 illustrates a prior art transmitter and receiver system for sending additional data (TxData) using common mode signaling over an existing PanelLink® signaling system. This scheme modulates the common mode of two PanelLink® channels in opposite directions to represent a bit and detects the difference of the common mode of those two channels to recover the bit. There are four channels in a PanelLink® Tx-Rx pair so two common mode signaling channels can be added. U.S. Pat. No. 6,307,543 to Martin provides additional information.

Referring to FIG. 1, a chip 120 (for example, a PanelLink® transmitter) is coupled to a chip 122 (for example, a PanelLink® receiver) through a first channel 124 including conductors 126 and 128 and a second channel 130 including conductors 132 and 134. Red data is provided differentially through input signals Tx-R+ and Tx-R− at the gates of transistors Q1 and Q2, and green data is provided differentially through input signals Tx-G+ and Tx-G− at the gates of transistors Q3 and Q4, where transistors Q1-Q4 are N-channel metal oxide semiconductor field effect transistor (NMOS-FETs). VDD is at 3.3 volts. Resistors R2, R3, R6, and R7 have 50 ohm values.

When Tx-R+ is high and Tx-R− is low, transistor Q1 is ON and the voltage of conductor 126 is pulled down by 500 mV from VDD based on the values of resistors R1 and R2, and transistor Q2 is OFF so that the voltage of conductor 128 is essentially VDD. Similarly, when Tx-R+ is low and Tx-R− is high, transistor Q2 is ON and the voltage of conductor 128 is pulled down by 500 mV from VDD based on the values of resistors R1 and R3, and transistor Q1 is OFF so that the voltage of conductor 126 is essentially VDD. Accordingly, the common mode is 3.05 volts=(3.3+2.8)/2. Comparator 146 provides a high or low output based on whether conductor 126 has a higher or low voltage than on conductor 128. The same is true with the Tx-G+ and Tx-G− signals and transistors Q3, Q4, Q7, and Q8, conductors 132 and 134, and resistors R6, R7, and R10. Comparator 150 provides a high or low output based on whether conductor 132 has a higher or low voltage than on conductor 134.

When Tx-Data in chip 122 is high, the common mode on conductors 126 and 128 is made slightly higher because transistors Q5 and Q6 are turned ON reducing the effective resistance between conductors 126 and VDD or conductor 128 and VDD. However, when Tx-Data is high, transistors Q7 and Q8 are OFF so that the common mode of conductors 132 and 134 remains unchanged. Conversely, when Tx-Data is low, the common mode on conductors 132 and 134 is changed slightly because transistors Q7 and Q8 are turned ON reducing the effective resistance between conductors 132 and VDD or conductor 134 and VDD. However, when Tx-Data is low, the common mode of conductors 126 and 128 remains unchanged.

When Tx-Data is high, the voltage at node N1 is higher than the voltage at node N2. Comparator 160 provides a high output Rx-Data in response thereto. Conversely, when Tx-Data is low, the voltage at node N2 is higher than the voltage at node N1. Comparator 160 provides a low output Rx-Data in response thereto. In this way, an additional signal Tx-Data can be simultaneously transmitted over channels 124 and 130.

The signaling may be fully differential or pseudo-differential.

SUMMARY

In some embodiments, a chip includes transmitters to transmit differential signals on conductors, and current mode circuitry to selectively modulate a common mode voltage of the differential signals to communicate data.

In other embodiments, a system includes a first chip and second chip. The first chip transmits first and second differential signals on conductors. The second chip includes receivers to receive the first and second differential signals from the conductors and provide received signals representative thereof, and current mode circuitry to selectively modulate a common mode voltage of either the first or second differential signals to communicate data and wherein the first chip includes common mode detection circuitry to detect changes in the common mode voltage.

In other embodiments, a system includes a first chip and second chip. The first chip transmits first and second differential signals on conductors. The first chip includes transmitters to transmit first and second differential signals on conductors, and current mode circuitry to selectively modulate first and second common mode voltages of the first and second differential signals to communicate first and second data. The second chip includes receivers to receive the first and second differential signals from the conductors and provide received signals representative thereof, and common mode detection circuitry to detect changes in the common mode voltage of the first and second differential signals.

In other embodiments, a system includes a first chip and second chip. The first chip transmits first and second differential signals on conductors. The first chip includes transmitters to transmit first and second differential signals on conductors, and current mode circuitry to selectively modulate a common mode voltage of the first or second differential signals to communicate data. The second chip includes receivers to receive the first and second differential signals from the conductors and provide received signals representative thereof, and common mode detection circuitry to detect changes in the common mode voltage of the first or second differential signals.

In other embodiments, a system includes a first chip and second chip. The first chip transmits first and second differential signals on conductors. The first chip includes transmitting circuitry to transmit differential signals on conductors, current mode circuitry to selectively modulate a common mode voltage of the differential signals to communicate a first data signal, and detection circuitry to detect changes in the common mode voltage. The second chip includes receivers to receive the differential signals from the conductors and provide received signals representative thereof, current mode circuitry to selectively modulate the common mode voltage to communicate a second data signal, and detection circuitry to detect changes in the common mode voltage.

Other embodiments are described and claimed.

BRIEF DESCRIPTION OF THE DRAWINGS

The inventions may best be understood by referring to the following description and accompanying drawings that are used to illustrate embodiments of the invention. However, the inventions are not limited to the details of these drawings.

FIG. 8 is a block diagram representation of a system including a transmitter chip, a receiver chip, a display, and audio speakers according to some embodiments of the invention.

DETAILED DESCRIPTION

Figure 1:
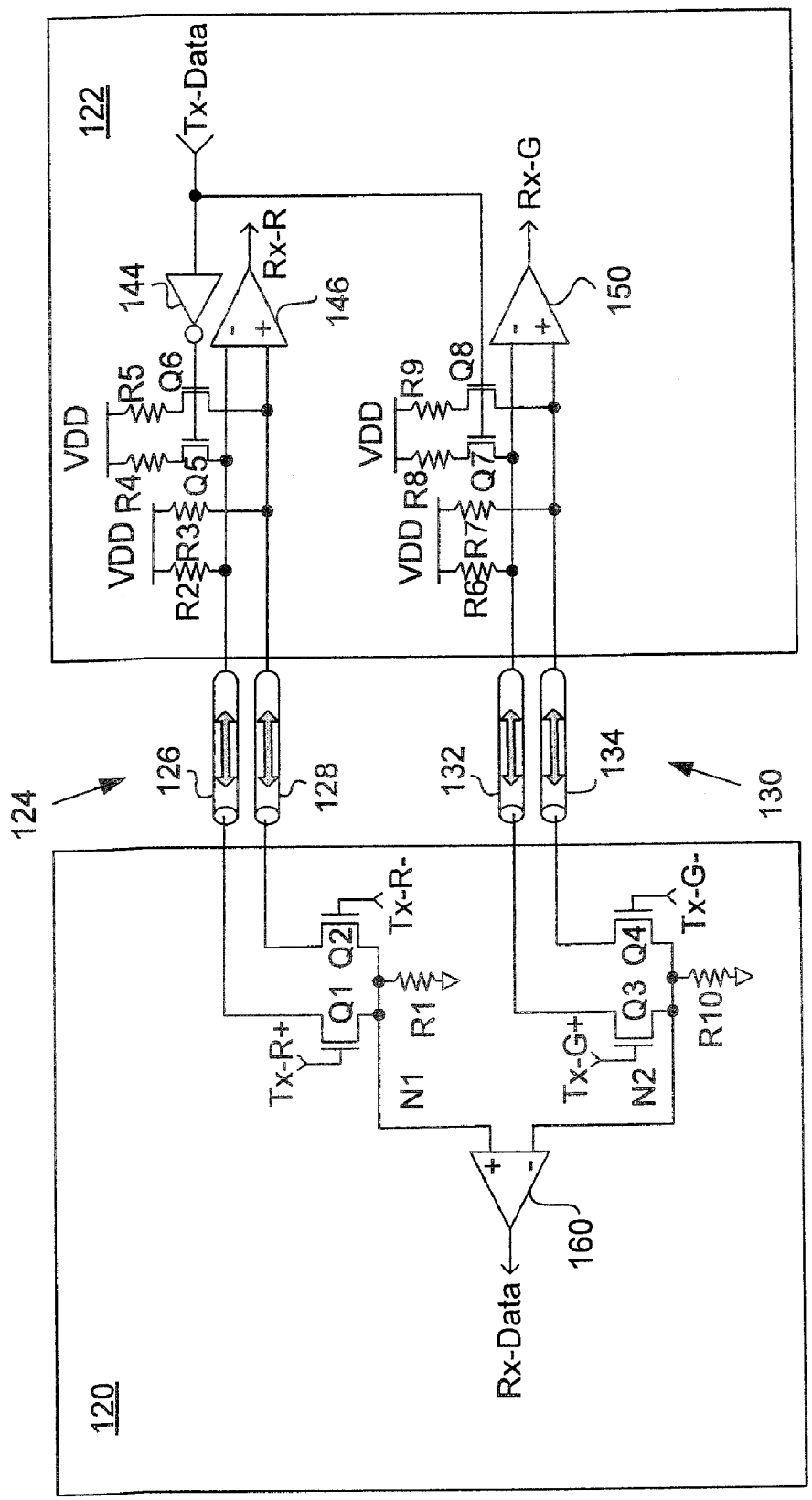
FIG. 1 is a block diagram representation of a prior art system including a first and second chips coupled through conductors.
Figure 2:
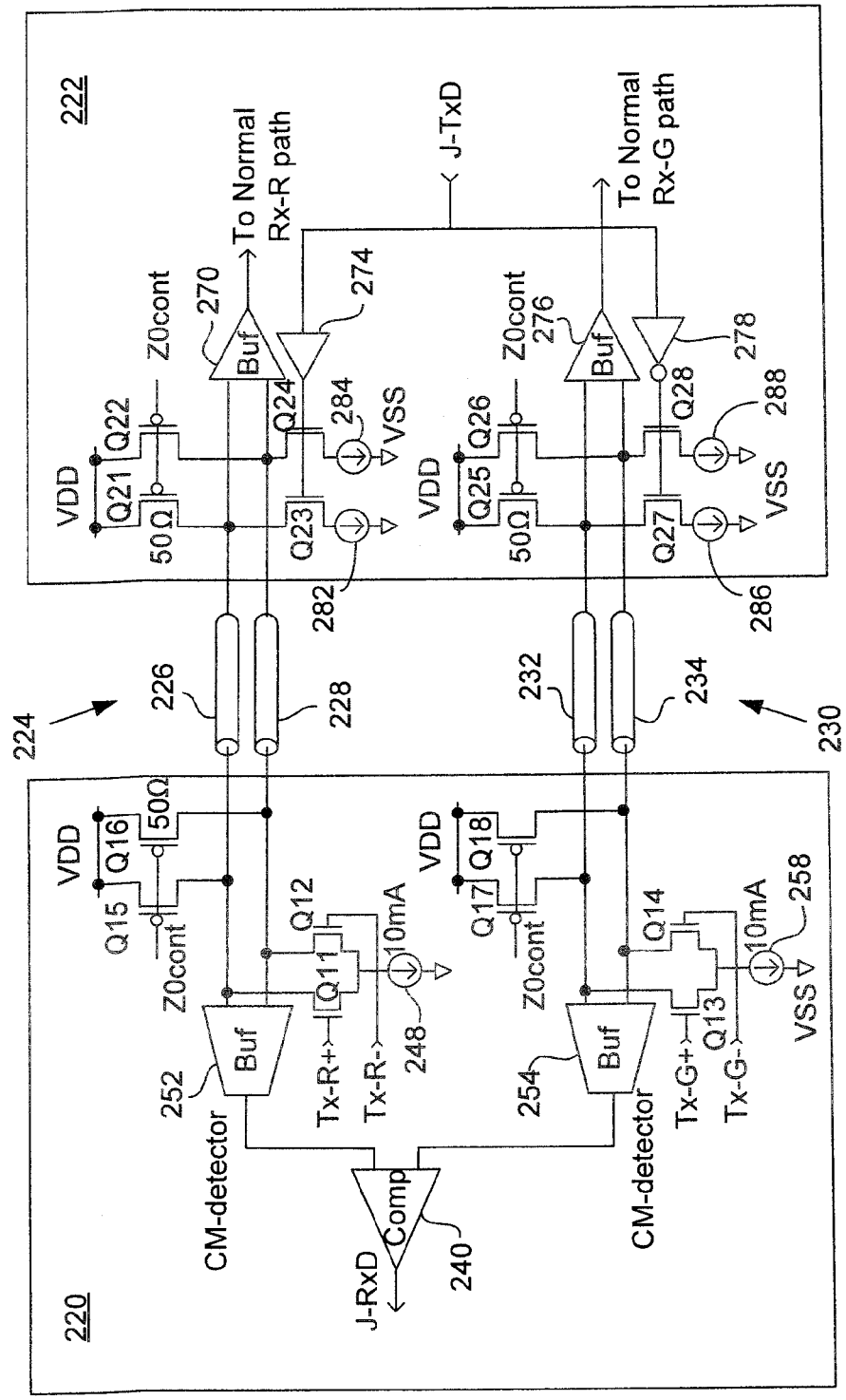
FIG. 2 is a block diagram representation of a system including a first and second chips coupled through conductors according to some embodiments of the invention.

FIG. 2 provides similar functionality as the system of FIG. 1, but does so with a different and improved common mode driver/detector. The system of FIG. 2, uses current mode driving for common mode modulation. In some implementations, this reduces the interference between common and differential mode. The system of FIG. 2 also has common mode termination in the Tx side (chip 220). In some implementations, this reduces reflections of a transmitted common mode signal which could be converted to a differential component as it traverses the conductors. Further, the system of FIG. 2 uses dedicated a common mode detector. In some implementations, this leads to better performance.

Referring to FIG. 2, a system 210 provides simultaneous bi-directional signaling between a chip 220 and a chip 222 through a first channel 224 including conductors 226 and 228 and a second channel 230 including conductors 232 and 234. As an example, chip 220 may include a PanelLink® transmitter and chip 222 may include a PanelLink® receiver, but the inventions are not limited to use with PanelLink® compliant transmitters and receivers. Indeed, the inventions may be used in connection with various other transmitters, receivers, and systems that are not PanelLink® compliant.

Red data is provided differentially on conductors 226 and 228 in response to input signals Tx-R+ and Tx-R– at the gates of transistors Q11 and Q12. Green data is provided differentially on conductors 232 and 234 in response to input signals Tx-G+ and Tx-G– at the gates of transistors Q13 and Q14. Comparator 270 compares the voltages of conductors 226 and 228 to produce a received Rx-R (red data) signal, and comparator 276 compares the voltages of conductors 232 and 234 to produce a received Rx-G (green data) signal. During ordinary operation, a signal Z0cont (control) has a low voltage (for example, ground) to turn on P-channel metal oxide semiconductor field effect transistors (PMOSFETs) Q15, Q16, Q17, Q18, Q21, Q22, Q25, and Q25. Unless something else pulls the signals to a lower voltage, the voltages on conductors 226, 228, 232, and 234 will be pulled through Q15, Q16, Q17, Q18, Q21, Q22, Q25, and Q25 to voltage VDD. In some embodiments, while chip 220 and 222 are powered, Z0cont is kept low except when the system is in a low power mode.

When Tx-R+ is high (has a high voltage) and Tx-R– is low (has a low voltage), transistor Q11 is ON and the voltage of conductor 226 is pulled down by about 250 mV from VDD, and transistor Q12 is OFF so that the voltage of conductor 228 remains at VDD. Accordingly, the common mode is 3.175 volts=(3.3+3.05)/2. There is a 250 mV voltage drop because a current source 248 pulls 10 milliamps through parallel 50 ohm transistors Q15 and Q21, which has an effective resistance of 25 ohms. The resistances of Q11, Q12, Q13, and Q14 are very low resistance and are ignored in the voltage calculation. Similarly, when Tx-R– is high and Tx-R+ is low, transistor Q12 is ON and the voltage of conductor 228 is pulled down by about 250 mV from VDD, and transistor Q11 is OFF so that the voltage of conductor 226 remains at VDD. Comparator 270 outputs a received signal Rx-R that has, for example, a high voltage when the voltage on conductor 226 is greater than the voltage on conductor 228, and a low voltage when the voltage on conductor 228 is greater than the voltage on conductor 226.

Likewise, when Tx-G+ is high and Tx-G– is low, transistor Q13 is ON and the voltage of conductor 232 is pulled down by about 250 mV from VDD, and transistor Q14 is OFF so that the voltage of conductor 234 remains at VDD. Similarly, when Tx-G– is high and Tx-G+ is low, transistor Q14 is ON and the voltage of conductor 234 is pulled down by about 250 mV from VDD, and transistor Q13 is OFF so that the voltage of conductor 232 remains at VDD. Comparator 278 outputs a received signal Rx-G that has, for example, a high voltage when the voltage on conductor 226 is greater than the voltage on conductor 228, and a low voltage when the voltage on conductor 228 is greater than the voltage on conductor 226.

The common mode can be modulated as follows to transmit additional data from chip 222 to chip 220, which is the opposite direction that red and green data is transmitted. At the transmit end, additional data is referred to as J-TxD, where the letter J indicates a signal to modulate the common mode, Tx indicates the signal on the transmit side of the process, and D indicates data. Note that the J data may be used for any purpose including as a control signal.

When J-TxD is high, a buffer 274 provides a high signal to transistors Q23 and Q24 so they are ON and an inverter 278 provides a low signal to transistors Q27 and Q28 so they are OFF. When transistors Q23 and Q24 are ON, the voltage of conductor 226 is pulled lower by 250 millivolts because current source 282 pulls 10 milliamps through 50 ohm transistors Q15 and Q21, which have an effective resistance of 25 ohms. Likewise, the voltage of conductor 228 is pulled lower by 250 millivolts because current source 284 pulls 10 milliamps through 50 ohm transistors Q16 and Q22, which have an effective resistance of 25 ohms. However, when J-TxD is high so that transistors Q27 and Q28 are OFF, and the common mode of conductors 232 and 234 remain unchanged.

By contrast, when J-TxD is low, buffer 274 provides a low signal to transistors Q23 and Q24 so they are OFF and the common mode of conductors 226 and 228 remains unchanged. However, with J-TxD low, inverter 278 provides a high signal to transistors Q27 and Q28 so they are ON. When transistors Q27 and Q28 are ON, the voltage of conductor 232 is pulled lower by 250 millivolts because current source 288 pulls 10 milliamps through 50 ohm transistors Q17 and Q25, which have an effective resistance of 25 ohms. Likewise, the voltage of conductor 234 is pulled lower by 250 millivolts because current source 288 pulls 10 milliamps through 50 ohm transistors Q18 and Q26, which have an effective resistance of 25 ohms.

Common mode detector (CM detector) 252 detects whether the common mode voltage on conductors 226 and 228 has been reduced and provides, for example, a high voltage if it has been reduced and a low voltage if it has not been reduced. Likewise, CM detector 254 detects whether the common mode voltage on conductors 232 and 234 has been reduced and provides, for example, a high voltage if it has been reduced and a low voltage if it has not been reduced. There are various possible implementations of CM detectors 252 and 254. For example, the outputs of CM detectors 252 and 254 may be in the center of two resistors (for example, 1 kohm) in series.

Comparator 240 compares the values of the signals output from CM detectors 252 and 254 to provide the received data output signal J-RxD. As an example, if the output of CM detector 252 is high and the value of CM detector 254 is low, then the output J-RxD of comparator 240 is a high voltage—which matches the value of input signal J-TxD. Likewise, if the output of CM detector 252 is low and the value of CM detector 254 is high, then the output J-RxD of comparator 240 is a low voltage—which matches the value of input signal J-TxD. The opposite could also be implemented.

Accordingly, the additional data (J data) can be transmitted from chip 222 to chip 220. Color data, such as blue data, may be transmitted through additional conductors not shown in FIG. 2. Further, additional J data can also be transmitted. Examples are provided below.

The red and green signals and the J-TxD signal may be multiple bits wide. For example, the signals may be eight bits wide or some other number of bits such as ten or twelve bits wide.

Figure 3:
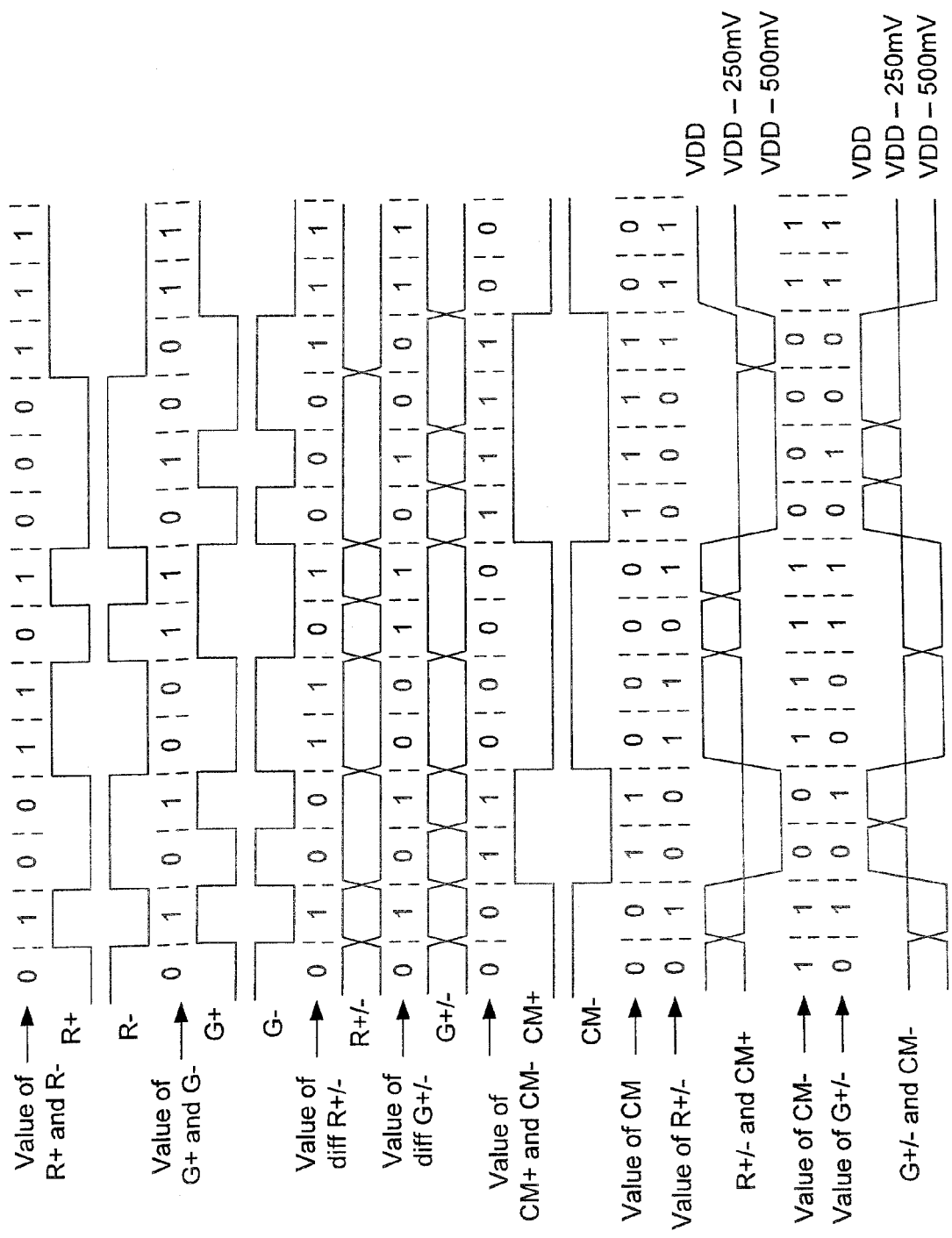
FIG. 3 is a timing diagram that illustrates some signals used in some embodiments of the invention.

FIG. 3 illustrates various timing diagrams that may be used to illustrate operation of the figures. At the top of FIG. 3, 0 and 1 values and graphical voltage representations for R+ and R− are illustrated. As an example, 0 represents a high voltage and 1 represents a low voltage, but the opposite could be the case. Note that a 0 value is represented when R+ has a low voltage and R− has a high voltage, and a 1 value is represented when R+ has a high voltage and R− has a low voltage. In other implementations, the opposite values could be assigned to these voltage levels. Below, the separately presented R+ and R− graphical representations, 0 and 1 values and separately presented graphical voltage representations for G+ and G− are illustrated. Likewise, in this example, a 0 value is represented when G+ has a low voltage and G− has a high voltage, and a 1 value is represented when G+ has a high voltage and G− has a low voltage. Below the separately presented R+ and R− representations and the separately presented G+ and G− representations are combined R+/− and G+/− representations with corresponding 0 and 1 values.

Below the combined R+/− and G+/− representations are separately presented CM+ and CM− values with corresponding 0 and 1 values. The CM+ and CM− represent J-TxD and are the outputs buffer 274 and inverter 278. The CM+ and CM− values are passed between chips by changing the common mode on the conductors that carry the R+/− signals. Below the separately presented CM+ and CM− values are combined R+/− and CM+ signals with corresponding 0 and 1 values, wherein the CM+ signal is superimposed on the differential R+/− signals on conductors 226 and 228. Below this are combined G+/− and CM− signals with corresponding 0 and 1 values, wherein the CM− signal is superimposed on the differential G+/− signals on conductors 232 and 234.

Note that in FIG. 3, the graphical voltage levels are idealized and in practice would have less sharp transitions. In some implementations, they would look more sinusoidal.

Figure 4:
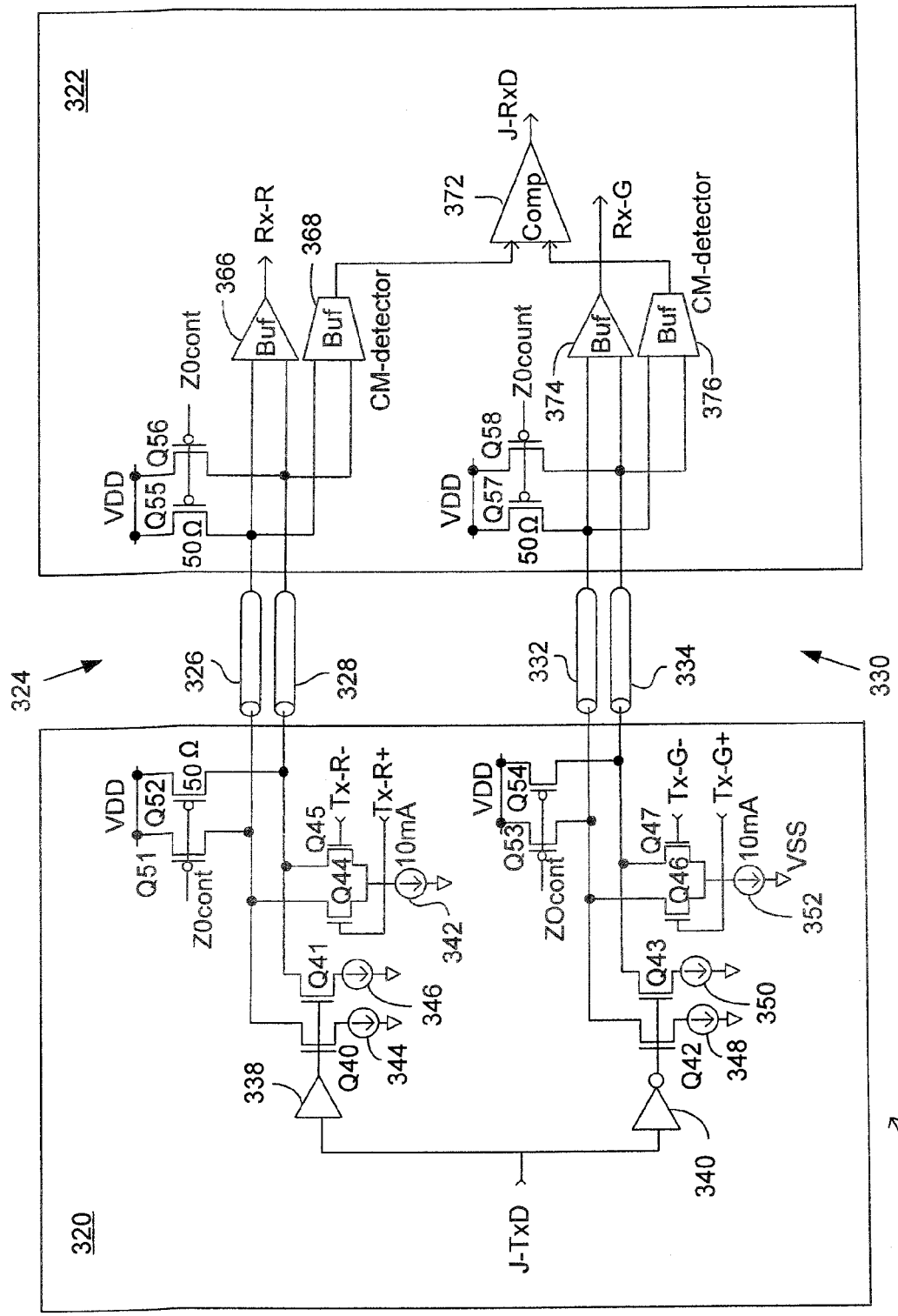
FIG. 4 is a block diagram representation of a system including a first and second chips coupled through conductors according to some embodiments of the invention.

In FIG. 2, the additional data (J-data or common mode modulated data) travels in the opposite direction than the R+/− and G+/− data. In FIG. 4, the J-data travels in the same direction as the R+/− and G+/− data. Otherwise, the chips of FIG. 4 operate in a similar way to the chips of FIG. 2.

Referring to FIG. 4, red data is provided differentially on conductors 326 and 328 in response to input signals Tx-R+ and Tx-R− at the gates of transistors Q44 and Q45. Green data is provided differentially on conductors 332 and 334 in response to input signals Tx-G+ and Tx-G− at the gates of transistors Q46 and Q47. Comparator 366 compares the voltages of conductors 326 and 328 to produce a received Rx-R (red data) signal, and comparator 374 compares the voltages of conductors 332 and 334 to produce a received Rx-G (green data) signal. During ordinary operation, a signal Z0cont (control) has a low voltage (for example, ground) to turn ON transistors Q51, Q52, Q53, Q54, Q55, Q56, Q57, and Q58. Unless something else pulls the signals to a lower voltage, the voltages on conductors 326, 328, 332, and 334 will be pulled through Q51, Q52, Q53, Q54, Q55, Q56, Q57, and Q58 to voltage VDD. In some embodiments, while chip 320 and 322 are powered, Z0cont is kept low except when the system is in a low power mode.

When Tx-R+ is high and Tx-R− is low, transistor Q44 is ON and the voltage of conductor 326 is pulled down by about 250 mV from VDD, and transistor Q45 is OFF so that the voltage of conductor 328 remains at VDD. Accordingly, the common mode is 3.175 volts=(3.3+3.05)/2. There is a 250 mV voltage drop because a current source 342 pulls 10 milliamps through parallel 50 ohm transistors Q51 and Q55, which has an effective resistance of 25 ohms. The resistances of Q44, Q45, Q46, and Q47 are very low resistance and are ignored in the voltage calculation. Similarly, when Tx-R− is high and Tx-R+ is low, transistor Q45 is ON and the voltage of conductor 328 is pulled down by about 250 mV from VDD, and transistor Q44 is OFF so that the voltage of conductor 326 remains at VDD. Comparator 366 outputs a received signal Rx-R that has, for example, a high voltage when the voltage on conductor 326 is greater than the voltage on conductor 328, and a low voltage when the voltage on conductor 328 is greater than the voltage on conductor 326.

Likewise, when Tx-G+ is high and Tx-G− is low, transistor Q46 is ON and the voltage of conductor 332 is pulled down by about 250 mV from VDD, and transistor Q47 is OFF so that the voltage of conductor 334 remains at VDD. Similarly, when Tx-G− is high and Tx-G+ is low, transistor Q47 is ON and the voltage of conductor 334 is pulled down by about 250 mV from VDD, and transistor Q46 is OFF so that the voltage of conductor 332 remains at VDD. Comparator 374 outputs a received signal Rx-G that has, for example, a high voltage when the voltage on conductor 326 is greater than the voltage on conductor 328, and a low voltage when the voltage on conductor 328 is greater than the voltage on conductor 326.

The common mode can be modulated as follows to transmit additional data (J-TxD) from chip 320 to chip 322, by changing (modulating) the common mode on conductors 326 and 328 or on conductors 332 and 334, while leaving the common mode of the other unchanged. When J-Tx-D (J—transmit data) is high, buffer 338 turns transistors Q40 and Q41 ON so that 10 millivolt current source 344 pulls the voltage of conductor 326 down by about 250 millivolts through the resistance of 50 ohm transistors Q51 and Q55, and 10 millivolt current source 346 pulls the voltage of conductor 328 down by about 250 millivolts through the resistance of 50 ohm transistors Q52 and Q56. Accordingly, the common mode of conductors 326 and 328 is also reduced by about 250 millivolts. Inverter 340 provides a low voltage signal so Q42 and Q43 are OFF and the common mode of conductors 332 and 334 is not reduced.

Similarly, when J-Tx-D is low, buffer 338 provides a low voltage to Q40 and Q41 so they are OFF and the common mode of conductors 326 and 328 remain unchanged. However, inverter 340 provides a high signal to transistors Q42 and Q43 so they are ON. With Q42 and Q43 ON, current source 348 pulls the voltages of conductor 332 down by about 250 millivolts through 50 ohm transistors Q53 and Q57, current source 350 pulls the voltages of conductor 334 down by about 250 millivolts through 50 ohm transistors Q54 and Q58. Accordingly, the common mode of conductors 332 and 334 is also reduced by about 250 millivolts.

Common mode detector 368 detects that the common mode on conductors 326 and 328 has been reduced and provides a signal to one of the inputs of comparator 372 so indicating. CM detector 376 detects that the common mode on conductors 332 and 334 has not been reduced and provides a signal to another input of comparator 372. As an example, if J-Tx-D is high, then the output of CM detector 368 is high, the output of CM detector 376 is low, and the output of comparator 372 is high. In this example, if J-Tx-D is low, the outputs of CM detector 368, CM detector 376, and comparator 372 are low, high, and low. Of course, the opposite convention could be used.

In some embodiments, system 310 of FIG. 4 includes additional circuitry that causes Q40, Q41, Q42, and Q44 to be OFF regardless of the voltage of J-TxD. A reason to do this is so that chip 322 does not detect either a high or low common mode signal. System 210 of FIG. 2 could have similar circuitry.

Figure 5:
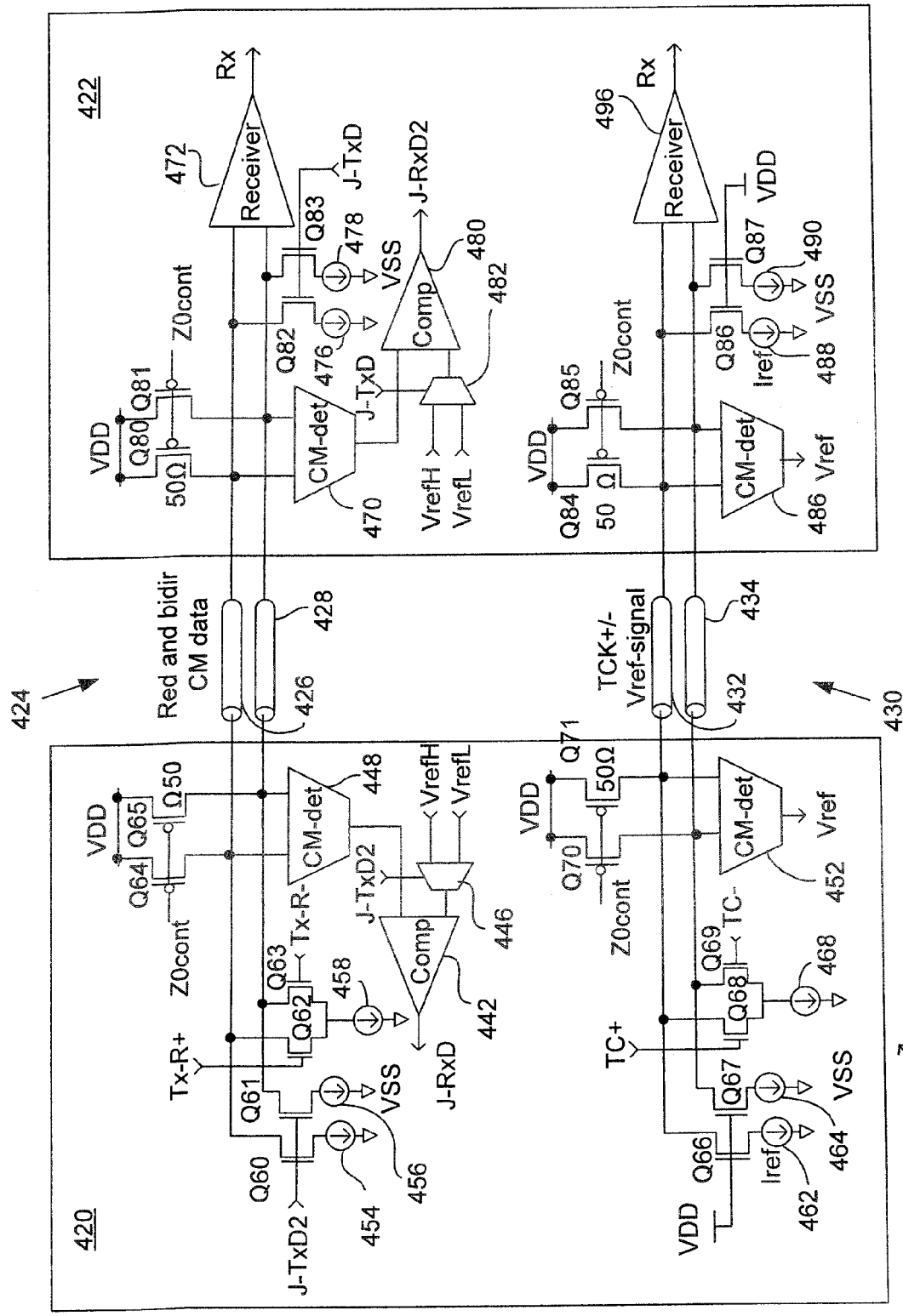
FIG. 5 is a block diagram representation of a system including a first and second chips coupled through conductors according to some embodiments of the invention.

FIG. 5 illustrates a system 410 in which some data (for example, red video data) are provided from chip 420 to chip 422. Multi-level common mode signaling can be used to provide an additional signals (J-TxD and J-TxD2) bi-directionally from chip 420 to chip 422 and from chip 422 to chip 420 over the same channel. A first channel 424 includes conductors 426 and 428 and a second channel 430 includes conductors 432 and 434. Note that there may be additional channels to carry addition signals such additional video data. For example, channel 424 may carry merely red data and there may be other channels like channel 424 to carry green data and blue data. These other channels may or may not also transmit uni-directional or bi-directional common mode data.

During ordinary operation, a signal Z0cont (control) has a low voltage (for example, ground) to turn ON transistors Q64, Q65, Q70, Q71, Q80, Q81, Q84, and Q85. Unless something else pulls the signals to a lower voltage, the voltages on conductors 426, 428, 432, and 434 will be pulled through Q64, Q65, Q70, Q71, Q80, Q81, Q84, and Q85 to voltage VDD. In some embodiments, while chip 420 and 422 are powered, Z0cont is kept low except when the system is in a low power mode.

In FIG. 5, when Tx-R+ is high and Tx-R− is low, transistor Q62 is ON and the voltage of conductor 426 is pulled down by about 250 mV from VDD, and transistor Q63 is OFF so that the voltage of conductor 428 remains at VDD. Accordingly, the common mode is 3.175 volts=(3.3+3.05)/2. There is a 250 mV voltage drop because a current source 458 pulls 10 milliamps through parallel 50 ohm transistors Q64 and Q80, which has an effective resistance of 25 ohms. The resistances of Q60, Q61, Q62, Q63, Q66, Q67, Q68, Q69, Q82, Q83, Q86, and Q87 are very low resistance and are ignored in voltage calculations. Similarly, when Tx-R− is high and Tx-R+ is low, transistor Q63 is ON and the voltage of conductor 428 is pulled down by about 250 mV from VDD, and transistor Q62 is OFF so that the voltage of conductor 426 remains at VDD. Receiver 472 outputs a received signal Rx-R that has, for example, a high voltage when the voltage on conductor 426 is greater than the voltage on conductor 428, and a low voltage when the voltage on conductor 428 is greater than the voltage on conductor 426.

The common mode signaling on conductors 426 and 428 is summarized in Table 1 in which CM-detectors 448 and 470 give low voltage outputs if the common mode is not reduced, give medium voltage outputs if the common mode is reduced by 250 millivolts, and give high voltage outputs if the common mode is reduced by 500 millivolts.

TABLE 1

| J-TxD | J-TxD2 | Conductors 426 and 428 CM reduct | Selector 446 selects | CM-det 448 output | J-RxD | Selector 470 selects | CM-det | J-RxD2 |
|---|---|---|---|---|---|---|---|---|
| Low | Low | None | VrefL | Low | Low | VrefL | Low | Low |
| Low | High | 250 mV | VrefL | Med | Low | VrefH | Med | High |
| High | Low | 250 mV | VrefH | Med | High | VrefL | Med | Low |
| High | High | 500 mV | VrefH | High | High | VrefH | High | High |

In table 1, Low<VrefL<Med<VrefH<High, and comparators 442 and 480 are sensitive enough to detect differences among these signals. Selector 446 selects VrefL if J-TxD2 is low and selects VrefH is J-TxD2 is high. Likewise, selector 482 selects VrefL if J-TxD is low and selects VrefH is J-TxD is high.

When signals J-TxD and J-TxD2 are both low, transistors Q60, Q61, Q82, and Q83 are each OFF and the common mode of conductors 426 and 428 is not lowered. Since J-TxD and J-TxD2 are both low, selectors 446 and 482 each select a low voltage, but CM– detectors 448 and 470 each select the low reference voltage (VrefL). Since low<VrefL, comparators 442 and 280 provide low outputs J-RxD2 and J-RxD.

When J-TxD is low and J-TxD2 is high, selector 480 selects VrefL, selector 446 selects VrefH, Q82 and Q83 are OFF, and Q60 and Q61 are ON. Conductor 426 is pulled down through Q60 about 250 millivolts because current source 454 provides 10 milliamps current through 50 ohm transistors Q64 and Q80, which have an effective resistance of 25 ohms. Likewise, conductor 428 is pulled down through Q61 about 250 millivolts because current source 456 provides 10 milliamps current through 50 ohm transistors Q65 and Q81. Accordingly, CM-detectors 448 and 470 detect the drop in the common mode and provide a medium voltage signal to comparators 442 and 480. Since medium<VrefH, comparator 442 provides a low J-RxD and since VrefL<medium, comparator 480 provides a high J-RxD2. Just the opposite occurs when J-TxD is high and J-TxD2 is low.

When J-TxD and J-TxD2 are both high, selectors 446 and 480 both selects VrefH, and Q60, Q61, Q82, and Q83 are ON. Conductor 426 is pulled down through Q60 and Q82 about 500 millivolts because current sources 454 and 476 each provides 10 milliamps current through 50 ohm transistors Q64 and Q80. Likewise, conductor 428 is pulled down through Q61 and Q81 about 500 millivolts because current sources 456 and 478 each provide 10 milliamps current through 50 ohm transistors Q65 and Q81. Accordingly, CM-detectors 448 and 470 detect the drop in the 500 millivolt common mode and provide a high voltage signal to comparators 442 and 480. Since VrefH<high, comparator 442 provides a high J-RxD and comparator 480 provides a high J-RxD2.

A clock signal is provided differentially as TCK+ and TCK– on conductors 432 and 434 of channel 430. Transistors Q66, Q67, Q86, and Q87 are always ON so that reference current sources 462, 464, 488, and 490 provide currents on conductors 432 and 434 through 50 ohm transistors Q70, Q71, Q84, and Q85. (There may be additional circuitry to allow transistors Q66, Q67, Q86, and Q87 to be turned off in a low power mode.) When TC+ is high and TC– is low, transistor Q68 is ON so the voltage of conductor 432 is pulled down by about 250 mV from VDD as current source 468 pulls 10 milliamp current through parallel 50 ohm transistors Q69 and Q84, and transistor Q69 is OFF so the voltage of conductor 434 is not reduced. When TC+ is low and TC– is high, transistor Q69 is ON so the voltage of conductor 434 is pulled down by about 250 mV from VDD as current source 468 pulls 10 milliamp current through parallel 50 ohm transistors Q70 and Q85, and transistor Q68 is OFF so the voltage of conductor 432 is not reduced. Receiver 496 provides a clock output in response to the change in TCK+ and TCK–. CM-detectors 452 and 486 provide common mode reference signals.

Figure 6:
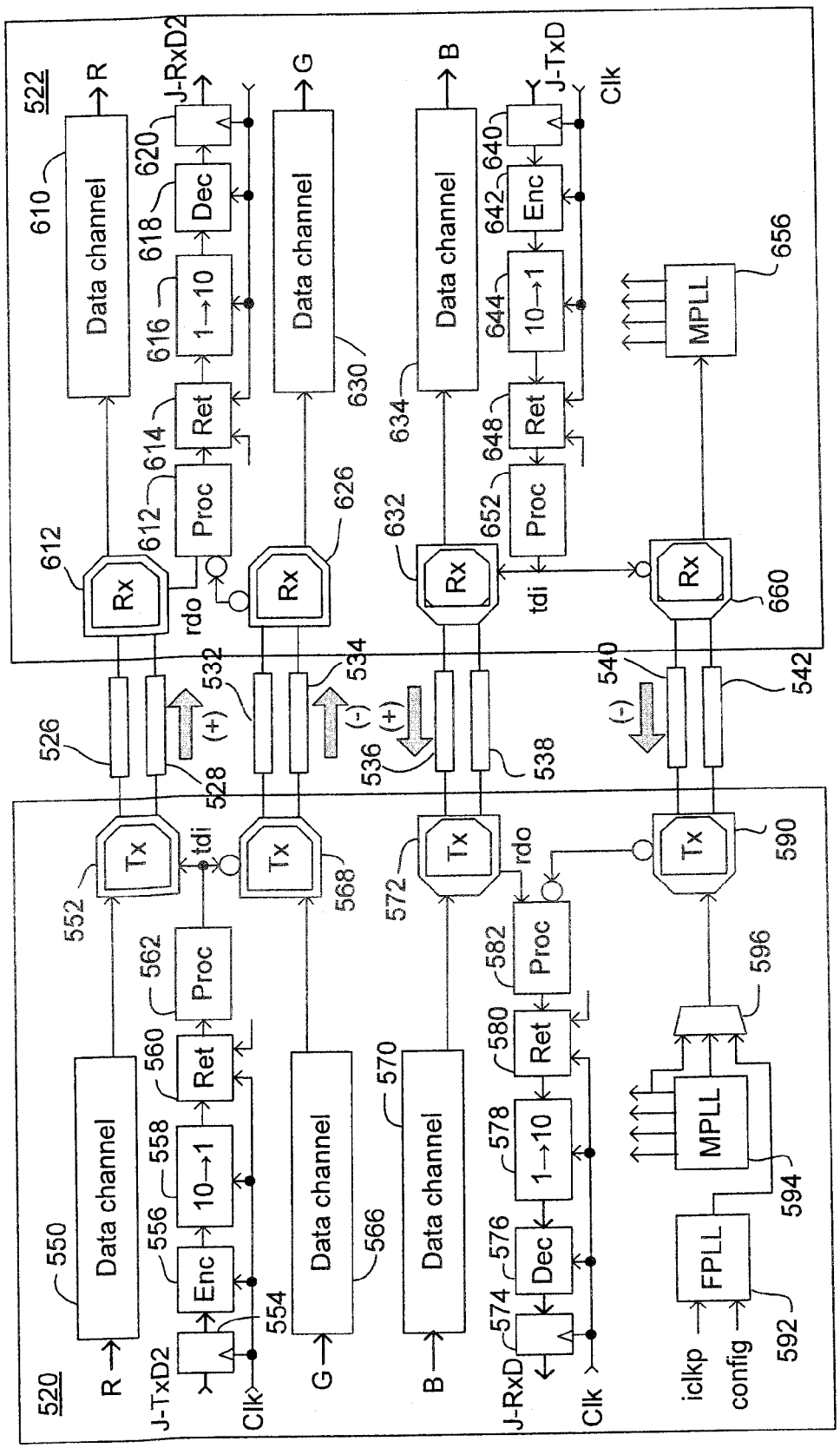
FIG. 6 is a block diagram representation of a system including a first and second chips coupled through conductors according to some embodiments of the invention.

FIG. 6 illustrates an implementation of one or more of the inventive designs described above in a PanelLink® compliant system. Red and green channels are used to transmit common mode data in a forward direction and blue and clock channels are used for transmitting common mode data in the backward direction. Auxiliary video/audio data or Universal Serial Bus (USB) packets can be transferred over an existing PanelLink® connection using one or more of the inventive designs.

Referring to FIG. 6, a chip 520 includes red and green data received by data channels 550 and 566, which in turn provide the red and green signals to transmitters 552, 568, and 572. A J-TxD2 signal is provided flip-flops 554, encoder 556, 10 bit→1 bit circuit 558, retimer circuit 560, and processing circuit 562 which produces a transmit data in signal tdi to be received by transmitters 552 and 568. If the J-TxD2 signal is eight bits wide, there may be eight parallel flip-flops, etc. Receivers 612 and 626 receives signals from transmitters 552 and 568 through conductors 526, 528 and 532, 534. Red and green data are provided from receivers 612 and 626 to data channels 610 and 630. Received data out (rdo) from receivers and inverted rdo are provided by receivers 612 and 626 to processing circuit 612, retiming circuit 614, 1 bit→10 bit circuit 616, decoder 618, and flip-flops 620 to provide signal J-RxD2.

Blue data is provided to data channel 570 which provide the green data to transmitter/receiver 572, which provides them on conductors 536 and 538 to receiver/transmitter 632. The received blue data is provided to data channel 634. A J-TxD signal is provided to flip-flops 640, encoder 642, 10 bit→1 bit circuit 644, retiming circuit 648, and processing circuit 652 which produces a transmit data in signal tdi to be received by receiver/transmitters 632 and 660. The common mode signal is transmitted by receiver/transmitters 632 and 660 on conductors 536, 538 and 540, 542 and received by transmitter/receivers 572 and 590 which provide a received data out signal rdo and inverter rdo to processing circuitry 582, retiming circuit 580, 10 bit→1 bit circuit 578, decoder 576, and flip-flops 574 to provide signal J-RxD. A filter phase locked loop (FPLL) 592 reject input jitter to provide a reference clock provides to a selector 596. Main PLLs (MPLL) 594 and 656 provides clock phases.

Figure 7:
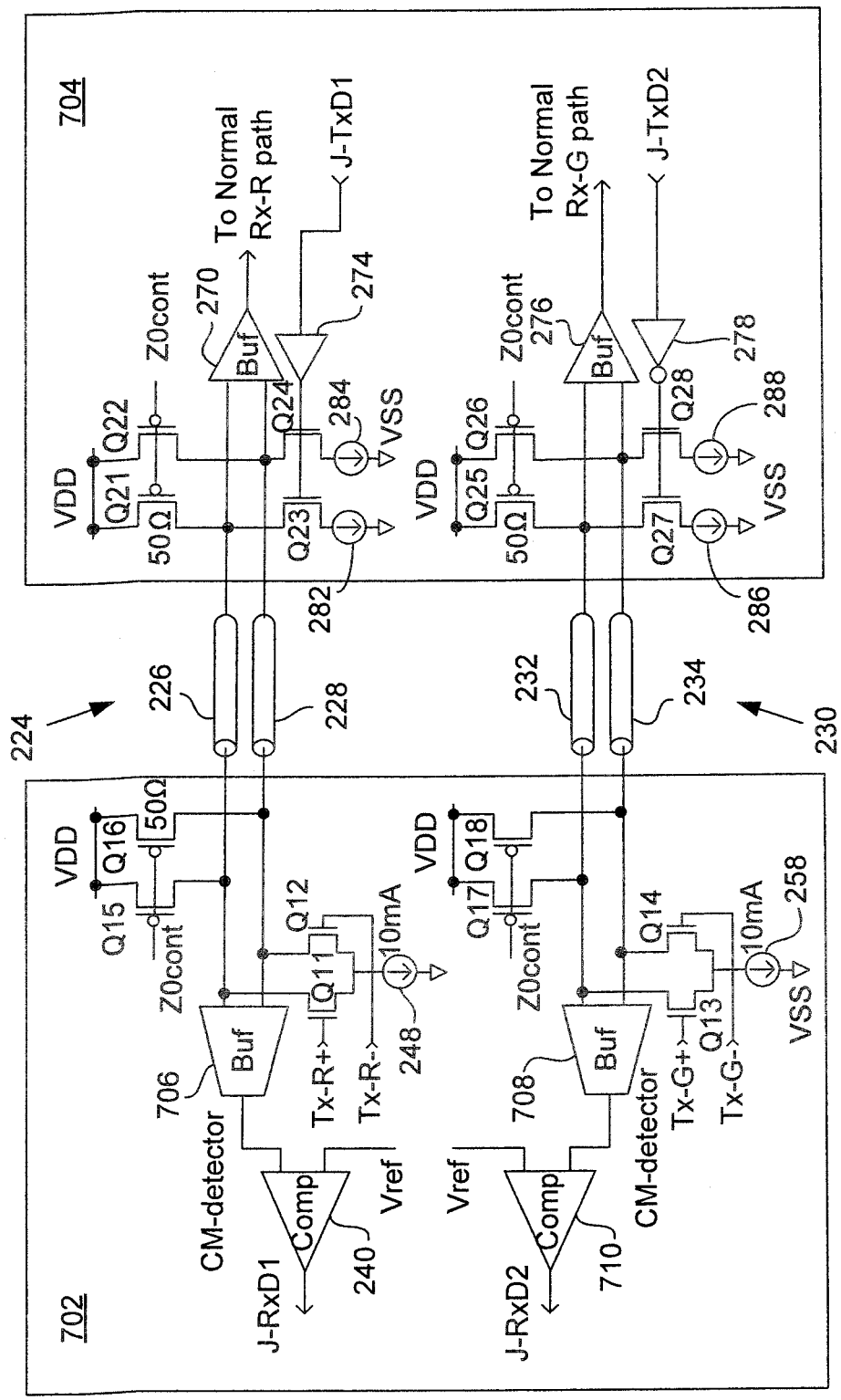
FIG. 7 is a block diagram representation of a system including a first and second chips coupled through conductors similar to FIG. 2 but with a pseudo differential arrangement according to some embodiments of the invention.

The above described examples are with fully differential common mode comparison signals. Alternatively, the common mode of a channel may be compared to a reference, and other channels independently sent. For example, FIG. 7 is similar to FIG. 2 except that in chip 704, two common mode signals J-TxD1 and J-TxD2 signals are sent independently over channels 224 and 230. In chip 702, CM-detector 706 provides an output indicative of whether the common mode on channel 224 has been decreased. The output of CM-detector 706 is compared against a reference (for example, VDD —250 mV) by comparator 240 to provide received signal J-RxD1. Similarly, CM-detector 708 provides an output indicative of whether the common mode on channel 230 has remained has been decreased. The output of CM-detector 708 is compared against a reference (for example, VDD—250 mV) by comparator 710 to provide received signal J-RxD2. The reference voltage for comparator 240 and 710 may be the same or different. CM-detectors 706 and 708 may be the same as or different than CM-detectors 252 and 254.

FIG. 8 illustrates a chip 720 including a transmitter and chip 732 including a receiver 722 and processing and driving circuitry 730 to driver a display 736 and speakers 738. Chips 720 and 732 are examples of the chips in FIGS. 2 and 4-7. Although the figures are described in connection with using video signals, the red, green, and blue video signals could be other types of signals. The chips described herein can perform a variety of functions including being video processing, microprocessors, microcontrollers, communication chips, memory chips, ASICs, to name only a few.

The above described embodiments can be modified in a variety of ways. Indeed, the figures are schematic in nature and not intended to necessarily represent actual circuit layouts. Further, in actual implementations, there will be various additional circuitry in the chips and there may be circuitry between circuitry illustrated in the figures. The illustrated components may have various additional inputs and outputs.

Alternatively, the common mode could be increased rather than reduced in response to J-TxD being a high versus a low voltage. The received Rx-R and Rx-G signals may be differential or signal ended. There may be cases in which TX-R+ =TX-R–. There may be a signal which causes some transistors (for example, Q23, Q24, Q27, and Q28) to be OFF regardless of the signal of J-TxD. The description states that certain transistor have very low resistance. In other embodiments, they could have higher resistance. When two separate current sources are shown (for example, 454 and 456), they could combined into one bigger current source. The data signals being transmitted may include a variety of information depending on the implementation.

Difference references to "some embodiments" are not necessarily referring to the same embodiments. If the specification states a component, feature, structure, or characteristic "may", "might", or "could" be included, that particular component, feature, structure, or characteristic is not required to be included. If the specification or claim refers to "a" structure, that does not mean there is only one of the structure.

While the invention has been described in terms of several embodiments, the invention should not limited to only those embodiments described, but can be practiced with modification and alteration within the spirit and scope of the appended claims. The description is thus to be regarded as illustrative instead of limiting.

What is claimed is:

1. A chip comprising:
   transmitters to transmit differential signals on conductors, wherein the conductors include first and second pairs of conductors, and the differential signals include first differential signals to be transmitted to the first pair of conductors and second differential signals to be transmitted to the second pair of conductors;
   current mode circuitry to selectively modulate a common mode voltage of the differential signals to communicate data; and
   common mode detection circuitry to detect changes in the common mode voltage.

2. The chip of claim 1, wherein the current mode circuitry includes transistors which selectively couple current sources to at least some of the conductors.

3. The chip of claim 1, wherein the current mode circuitry selectively modulates the common mode voltage of the first or second differential signals to the communicate data.

4. The chip of claim 1, further comprising pull up transistors between the conductors and a supply voltage VDD.

5. A method comprising:
   transmitting, via a first chip, first and second differential signals on conductors; and
   receiving, via receivers of a second chip, the first and second differential signals from the conductors and providing received signals representative thereof, and selectively modulating, via current mode circuitry, a common mode voltage of either the first or second differential signals to communicate data and wherein the first chip includes common mode detection circuitry to detect changes in the common mode voltage, wherein the common mode detection circuitry includes first and second common mode detection circuitry each providing an output to a comparator to recover the data through comparing outputs of the first and second common mode detection circuitry.

6. The method of claim 5, wherein the first differential signals are red video signals, and the second differential signals are green video signals, and the first chip includes additional transmitters to transmit blue video signals.

7. The method of claim 5, wherein the current mode circuitry includes transistors which selectively couple current sources to at least some of the conductors.

8. The method of claim 5, wherein the conductors include first and second pairs of conductors and the differential signals include first differential signals to be transmitted to the first pair of conductors and second differential signals to be transmitted to the second pair of conductors.

9. The method of claim 8, further comprising selectively modulating, via the current mode circuitry, the common mode voltage of the first or second differential signals to the communicate data.

10. A method comprising:
    transmitting, via transmitters of a first chip, first and second differential signals on conductors, and selectively modulating, via current mode circuitry, first and second common mode voltages of the first and second differential signals to communicate first and second data; and
    receiving, via receivers of a second chip, the first and second differential signals from the conductors and providing received signals representative thereof, and detecting, via common mode detection circuitry, changes in the common mode voltage of the first and second differential signals, wherein the common mode detection circuitry includes first and second common mode detection circuitry each providing an output to first and second comparators to recover the data through comparing outputs of the first and second common mode detection circuitry with reference voltage signals.

11. A method comprising:
    transmitting, via transmitters of a first chip, first and second differential signals on conductors, and selectively modulating, via current mode circuitry, a common mode voltage of the first or second differential signals to communicate data; and
    receiving, via receivers of a second chip, the first and second differential signals from the conductors and providing received signals representative thereof, and detecting, via common mode detection circuitry, changes in the common mode voltage of the first or second differential signals, wherein the common mode detection circuitry includes first and second common mode detection circuitry each providing an output to a comparator that recovers the data through comparing outputs of the first and second common mode detection circuitry.

12. The method of claim 11, wherein the first differential signals are red video signals, and the second differential signals are green video signals, and the first chip includes additional transmitters to transmit blue video signals.

13. The method of claim 11, wherein the transmitters in the first chip are current mode transmitters.

14. The method of claim 11, wherein the current mode circuitry includes transistors which selectively couple current sources to at least some of the conductors.

15. The method of claim 11, wherein the conductors include first and second pairs of conductors and the differential signals include first differential signals to be transmitted to the first pair of conductors and second differential signals to be transmitted to the second pair of conductors.

16. A method comprising:
    transmitting, via transmitting circuitry of a first chip, differential signals on conductors, and selectively modulating, via current mode circuitry, a common mode voltage of the differential signals to communicate a first data signal, and detecting, via detection circuitry, changes in the common mode voltage; and
    receiving, via receivers of a second chip, the differential signals from the conductors and providing received signals representative thereof, and selectively modulating, via current mode circuitry, to the common mode voltage to communicate a second data signal, and detecting, via detection circuitry, changes in the common mode voltage.

17. The method of claim 16, further comprising comparing, via a comparator of the first chip, an output of the common mode detector with a reference voltage that is selected in response to the first data signal, and comparing, via a comparator of the second chip, an output of the common mode detector with a reference voltage that is selected in response to the second data signal.

18. The method of claim 16, further comprising receiving, via a first buffer and an inverter of the current mode circuitry, a data signal and turning ON transistors associated with the differential signals.

19. The method of claim 16, wherein the current mode circuitry includes transistors which selectively couple current sources to at least some of the conductors.

20. A method comprising:
   transmitting, via transmitters, differential signals on conductors, wherein the conductors include first and second pairs of conductors, and the differential signals include first differential signals to be transmitted to the first pair of conductors and second differential signals to be transmitted to the second pair of conductors;
   selectively modulating, via current mode circuitry, a common mode voltage of the differential signals to communicate data; and
   detecting, via common mode detection circuitry, changes in the common mode voltage.

21. The method of claim 20, wherein the current mode circuitry includes transistors which selectively couple current sources to at least some of the conductors.

22. The method of claim 20, selectively modulating, via the current mode circuitry, the common mode voltage of the first or second differential signals to the communicate data.

23. The method of claim 20, further comprising pull up transistors between the conductors and a supply voltage VDD.

* * * * *